Figure 8:
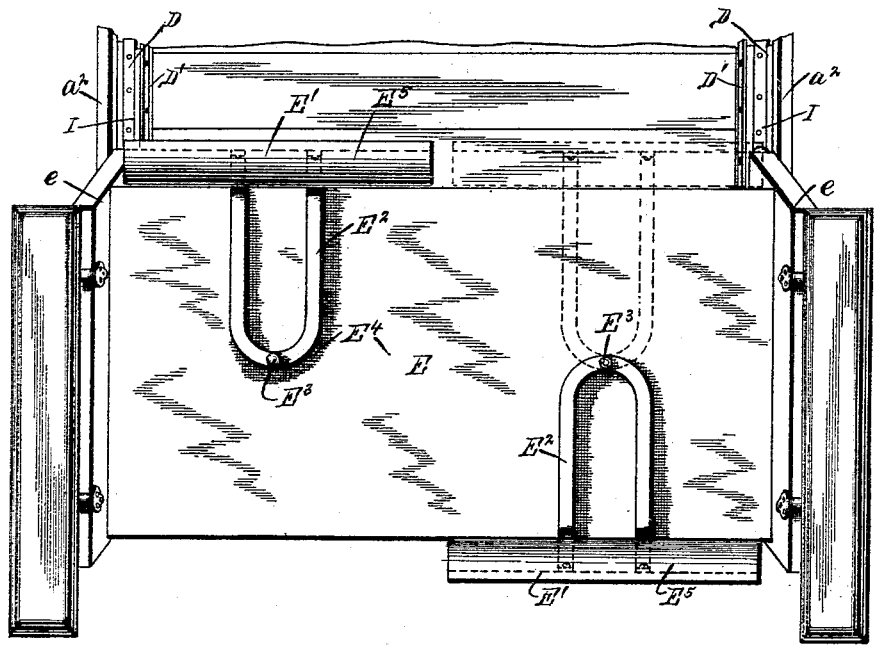

(No Model.) 3 Sheets—Sheet 1.
J. J. GILBERT.
VEHICLE.
No. 457,530. Patented Aug. 11, 1891.
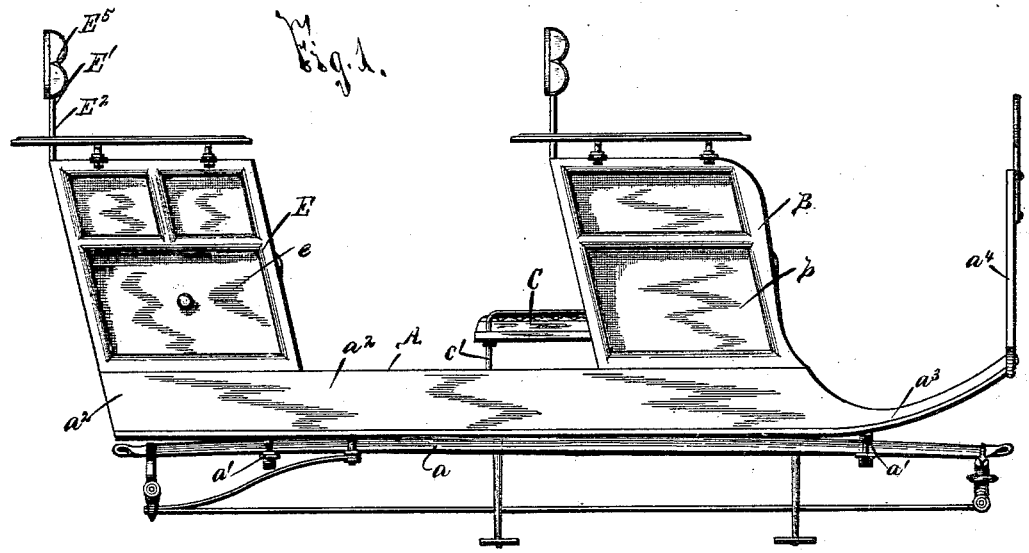
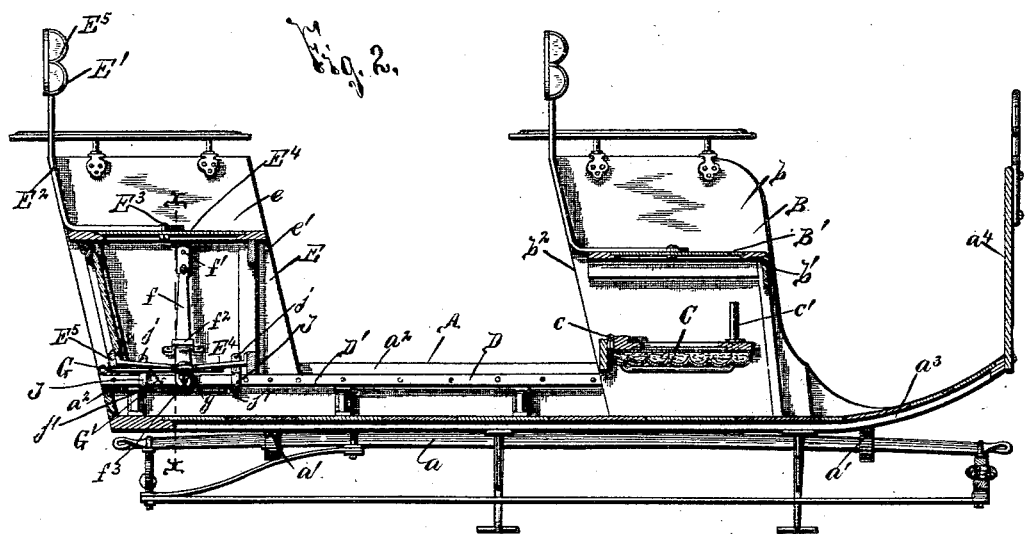
WITNESSES:
W. H. Randall.
H. E. Chase
INVENTOR
Joshua J. Gilbert
BY
Hey Wilkinson Downs
ATTORNEYS.
THE NORRIS PETERS CO., PHOTO-LITHO., WASHINGTON, D. C.

(No Model.) 3 Sheets—Sheet 2.
J. J. GILBERT.
VEHICLE.
No. 457,530. Patented Aug. 11, 1891.
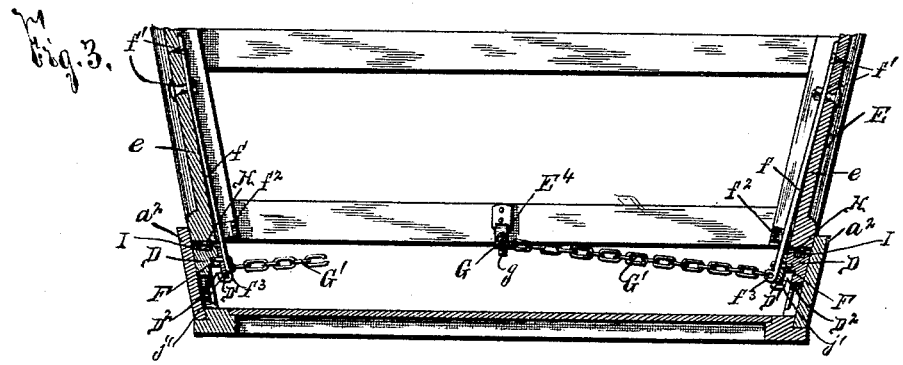
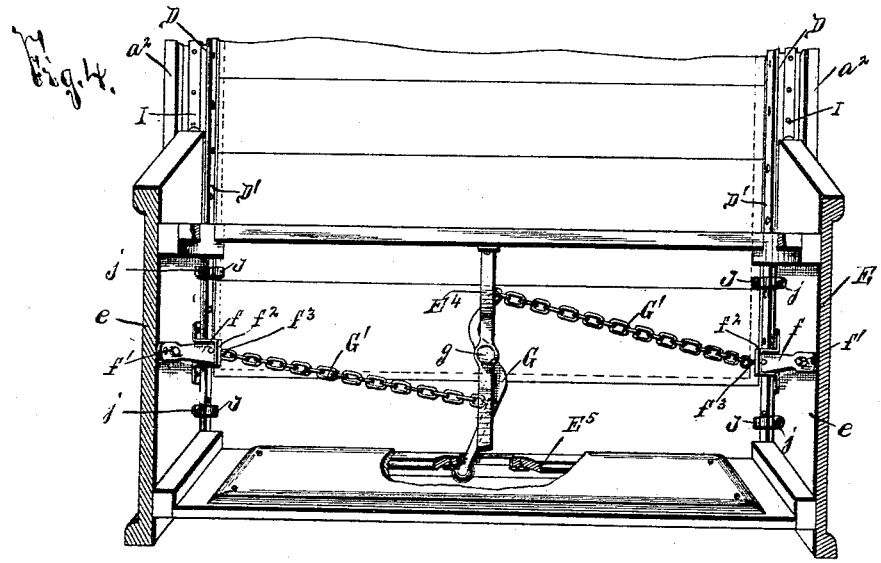
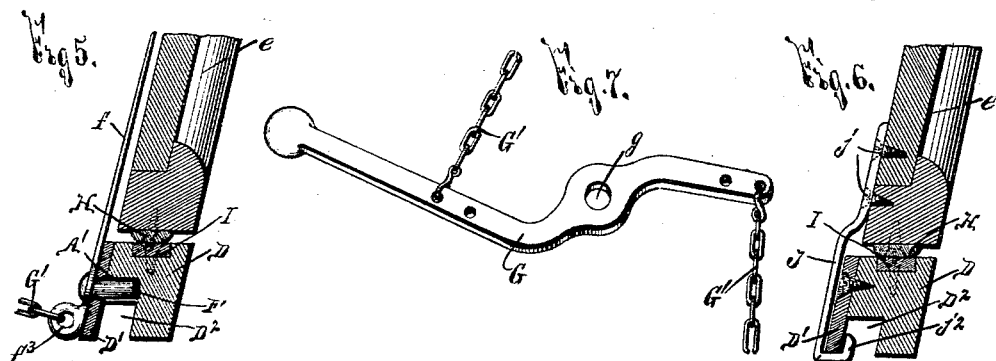
WITNESSES:
W. H. Randall,
W. E. Chase
INVENTOR
Joshua J. Gilbert.
BY
Hay Wilkinson Parsons
ATTORNEYS.

(No Model.) 3 Sheets—Sheet 3.
J. J. GILBERT.
VEHICLE.

No. 457,530. Patented Aug. 11, 1891.

WITNESSES:
W. H. Randall,
H. E. Chase

INVENTOR
Joshua J. Gilbert
BY
ATTORNEYS

UNITED STATES PATENT OFFICE.

JOSHUA J. GILBERT, OF SYRACUSE, NEW YORK, ASSIGNOR TO O. H. SHORT & CO., OF SAME PLACE.

VEHICLE.

SPECIFICATION forming part of Letters Patent No. 457,530, dated August 11, 1891.

Application filed January 6, 1891. Serial No. 376,862. (No model.)

*To all whom it may concern:*

Be it known that I, JOSHUA J. GILBERT, of Syracuse, in the county of Onondaga, in the State of New York, have invented new and useful Improvements in Vehicles, of which the following, taken in connection with the accompanying drawings, is a full, clear, and exact description.

My invention relates to an improved vehicle ordinarily termed a "buckboard," and has for its object the production of a simple and effective construction having a movable rear seat for permitting the occupants to ride dos-a-dos or facing in the same direction, as may be desired; and to this end the invention consists, essentially, in a front seat on the vehicle-body, guides extending rearwardly from the front seat, a rear seat movable on the guides and provided with a reversible back, a rounding projection on the rear seat for bearing upon said guide and lessening the friction, spring-actuated locking-bolts for holding the seat in its adjusted position, a pivoted lever hinged to the movable seat, and connections between said lever and the bolts for withdrawing the latter from their locking position.

The invention, furthermore, consists in a front seat having its seat portion hinged, an auxiliary seat hinged beneath the seat portion of the front seat and a depending projection secured to the hinged seat, a spring-bar for tensioning the locking-bolts, and a guide for the spring-bar, and in the detail construction and arrangement of the parts, all as hereinafter more particularly described, and pointed out in the claims.

In describing this invention reference is had to the accompanying drawings, forming a part of this specification, in which like letters indicate corresponding parts in all the views.

Figures 1 and 2 represent respectively side elevation and longitudinal vertical sectional views of my invention. Fig. 3 is a transverse vertical sectional view of my improved vehicle, taken on line $x$ $x$, Fig. 2. Fig. 4 is an isometric perspective of portions of the rear seat and vehicle-body, showing particularly the arrangement of the locking mechanism for holding the seat in its adjusted position.

Figs. 5 and 6 are detail vertical sectional views, the former representing the construction of the locking-bolt and the latter the guides on the vehicle-body and the ribs on the rear seat movable in said guides. Fig. 7 is an isometric perspective of the lever for withdrawing the locking-bolts from operative position; and Fig. 8 is an isometric perspective of the rear seat and a portion of the vehicle-body for illustrating the reversible back, one half of which is shown in its normal rear position and the other in its dos-a-dos position.

In that class of vehicles termed "buckboards" there has been a well-defined want for a construction in which by means of a movable rear seat that operates sufficiently easy to permit its ready and easy adjustment and which presents a very neat appearance when in either its forward or rearward position, the occupants may ride either facing in the same direction or dos-a-dos, as may be required. It is equally essential in this class of vehicles to provide an auxiliary seat for the children, which when in either its normal or operative position is entirely free from rattling. My invention is designed to possess these essential qualifications, and is simple in construction, easy in operation, durable and noiseless in use, and pleasing in appearance.

The vehicle-body A is mounted upon any suitable construction of gear, as bars $a$ and cross-bars $a'$, is essentially rectangular, and is formed with flaring sides $a^2$ and a projecting curved neck $a^3$, upon which is a suitable dash $a^4$. The front seat B is preferably stationary, with its sides $b$ rigidly secured to and inclining in conformity with the vehicle-side $a^2$ and raking rearwardly for the purpose of presenting a neat appearance. Beneath the seat proper B' of the seat B is an auxiliary seat C of desirable form and construction. As preferably constructed, however, this seat is hinged at $c$ at its rearward extremity and is provided at its forward extremity with a depending supporting standard or leg $c'$, which rests on the vehicle-bottom when the seat is in operative position.

To permit the withdrawal of the seat C into operative position the seat proper B' is preferably hinged at $b'$ at its forward extremity, whereby upon a slight elevation of its rear extremity the auxiliary seat C readily swings into position, as illustrated at Fig. 1.

For the purpose of preventing all rattling and noise the parts of the hinge $c$ fit each other tightly, and the sides of the seat preferably bear against guides on the seat sides $b$.

Extending rearwardly from the front seat are guides D, which preferably consist of a rail or rib on the inner face of the body sides $a^2$. Movable on these guides is the rear seat E, the sides $e$ of which preferably incline in conformity with the body sides $a^2$, with their front edges $e'$ adapted to rest against the rear edges $b^2$ of the forward seat when the rear seat is forced to its forward position and the vehicle is designed to be used with the occupants dos-a-dos.

E′ represents the reversible back for the rear seat, which, as best seen in Fig. 8, preferably consists of a pair of angular brackets $E^2$, pivoted at $E^3$ to the central portion of the rear seat proper $E^4$ and provided at their upper extremities with a suitable cushion or other back $e^5$, which may be swung to either the forward or rearward edge of the seat.

The locking-bolts F for securing the rear seat in its adjusted position, as preferably constructed, consist of a laterally-extending pin supported upon the lower end of a spring-bar $f$, having its upper end secured at $f'$ to the inner face of the rear seat E. The lower extremity of the bar $f$ is movable in a guide or U-shaped bracket $f^2$, also secured to the inner face of the said seat E, and is thereby prevented from lateral movement and compelled to hold the seat firmly in its adjusted position. The inner end of the locking-bolt is adapted to enter a recess or seat A′, formed in the inner face of the body A, and preferably the guide-rail D.

The lever G, adapted to withdraw the locking-bolts from operative position, is pivoted at $g$ to the under face of the rear seat proper $E^4$. Its rear extremity is extended backwardly through the rear side $E^5$ of the seat, and points on opposite sides of its pivotal point $g$ are by links or chains G′ connected to eyes $f^3$ on the spring-bars $f$. It is thus evident that by rocking the lever G the bolts are readily withdrawn from engagement.

In order to enable the seat to move in its adjustment with great ease, and also to render the parts extremely durable, I provide on the lower face of the sides $e$ the projecting rib H, having its lower face formed convex in cross-section and adapted to rest upon a metallic rib I in the top edge of the body side $a^2$. It will thus be noted that the bearing of the rear seat upon its guide is reduced to a minimum and that the friction is greatly lessened.

To prevent the rear seat from up-and-down movement, I preferably provide thereon the bar or depending foot J, having its upper end secured to the seat at $j$ and its lower end provided with the laterally-extending arm $j'$, which rests below a metallic face D′ upon the guide D, and is provided with the upturned projection $j^2$, that moves in a groove $D^2$ in the lower face of the guide D.

The operation of my invention will be readily perceived from the foregoing description and upon reference to the drawings, and it is evident that the parts are simple and effective in construction, that the rear seat is moved forward with great ease, is firmly held in its adjusted position, and presents a very pleasing appearance either in its forward or rearward position, and that, when desired, the auxiliary seat may be swung from its concealed position and greatly add to the seating capacity of the vehicle. It will be understood, however, that the detail construction and arrangement of the parts of my invention may be somewhat changed from that shown and described without departing from the spirit of my invention.

Having thus fully described my invention, what I claim as new, and desire to secure by Letters Patent, is—

1. In a vehicle, the combination, with a vehicle-body A, having projecting guide-ribs D on its side walls, of sockets A′, provided at intervals in said ribs, a seat E, movable along the guide-ribs and provided with a rear wall, a spring-bar $f$, secured to the inner wall of the rear seat, an outwardly-extending lug F, mounted on said bar and adapted to enter the sockets A′, a lever G, pivoted to the under side of the vehicle-seat with one extremity projecting beyond the rear wall thereof, and a connection G, connected to said lever at a point on one side of its center, substantially as specified.

2. In a vehicle, the combination, with a vehicle-body, a front seat, and guides extending rearwardly from the front seat and provided with sockets along their edge, of a spring-bar $f$, secured at one extremity to said rear seat with its other end free to move, a bolt rigidly secured to the free end of said spring-bar and adapted to enter said sockets for securing the rear seat in position, and a guide $f^2$ for preventing lateral movement of the spring-bar, substantially as described.

3. In a vehicle, the combination, with a vehicle-body, a front seat, and guides extending rearwardly from the front seat and provided with sockets along their edges, of a spring-bar $f$, secured at one extremity to said rear seat with its other end free to move, a bolt rigidly secured to the free end of said spring-bar and adapted to enter said sockets and secure the rear seat in position, a guide $f^2$ for preventing lateral movement of the spring-bar, an eye $f^3$, formed upon the free end of the spring-bar, a lever G, and a connection between said lever and eye, substantially as and for the purpose described.

4. The combination, with a seat having fixed sides and a hinged seat portion, of an auxiliary seat movably mounted beneath the seat portion of the former seat, guide-rails extending backwardly from the former seat, a rear seat movable on the guide-rails, a locking-bolt for securing the movable seat in position, and a reversible back on said seat, substantially as and for the purpose set forth.

5. The combination, with a seat having fixed sides and a hinged seat portion, of an auxiliary seat beneath the seat portion, having one side hinged and the other provided with a depending support, guide-rails extending backwardly from the forward seat, a rear seat movable on the guide-rails, and a locking-bolt for securing the movable seat in position, substantially as and for the purpose specified.

6. The combination, with a seat having fixed sides and a hinged seat portion, of an auxiliary seat beneath the seat portion, having one side hinged and the other provided with a depending support, guide-rails extending backwardly from the forward seat, a rear seat movable on the guide-rails, locking-bolts for securing the movable seat in position, springs for tensioning the locking-bolts, a lever pivoted to the rear seat, and connections having their opposite ends connected to the bolts and their adjacent ends connected to said lever on opposite points of its center, substantially as and for the purpose set forth.

7. In a vehicle, the combination, with a vehicle-body and a front seat having side walls and a movable seat portion B', of a support between the fixed sides of the seat, an auxiliary seat hinged at one extremity to said support and adapted to lie normally beneath the movable seat portion, and a support for supporting the opposite extremity of said seat when the same is in position for use, substantially as described.

In testimony whereof I have hereunto signed my name, in the presence of two attesting witnesses, at Syracuse, in the county of Onondaga, in the State of New York, this 20th day of December, 1890.

JOSHUA J. GILBERT.

Witnesses:
CLARK H. NORTON,
L. M. BAXTER.